United States Patent [19]

Varvello et al.

[11] Patent Number: 5,004,358
[45] Date of Patent: Apr. 2, 1991

[54] DEVICE ENABLING THE REVOLUTIONARY SPEED TO BE MEASURED BETWEEN TWO PARTS IN RELATIVE ROTATION SUCH AS THE SUPPORTS OF A VEHICLE WHEEL

[75] Inventors: Angelo Varvello; Angelo Vignotto; Roberto Moretti, all of Turin, Italy

[73] Assignee: RIV-SKF Officine di Villar Perosa S.p.A., Turin, Italy

[21] Appl. No.: 506,112

[22] Filed: Apr. 9, 1990

[30] Foreign Application Priority Data

Dec. 15, 1989 [IT] Italy ........................ 68093 A/89

[51] Int. Cl.⁵ .................................... F16C 19/00
[52] U.S. Cl. ........................ 384/446; 384/448; 384/476
[58] Field of Search ........... 384/448, 446, 476, 484, 384/477, 624

[56] References Cited

U.S. PATENT DOCUMENTS

| | | | |
|---|---|---|---|
| 4,732,494 | 3/1988 | Guers et al. | 384/446 |
| 4,783,180 | 11/1988 | Hayashi | 384/446 |
| 4,946,296 | 8/1990 | Olschewski et al. | 384/448 |
| 4,948,277 | 8/1990 | Alff | 384/448 |

*Primary Examiner*—Lenard A. Footland
*Attorney, Agent, or Firm*—Bachman & LaPointe

[57] ABSTRACT

A device enabling the revolutionary speed to be measured between two parts in relative rotation such as the supports of a vehicle wheel and in particular between rings of a rolling bearing for the support of a vehicle wheel, including a first shield integral with the rotating ring of the rolling bearing carrying a magnetized ring with a pair of alternate poles, which is placed in front of, in operation, a passive sensor borne by a second shield attached to the fixed ring of the bearing; the sensor is inductive and has n polar pieces in a number proportional to the pairs of alternate poles of the magnetized ring; the configurations of shields and sensor are such that the elements measuring the relative speed are integral with the shields and protected outwards.

7 Claims, 3 Drawing Sheets

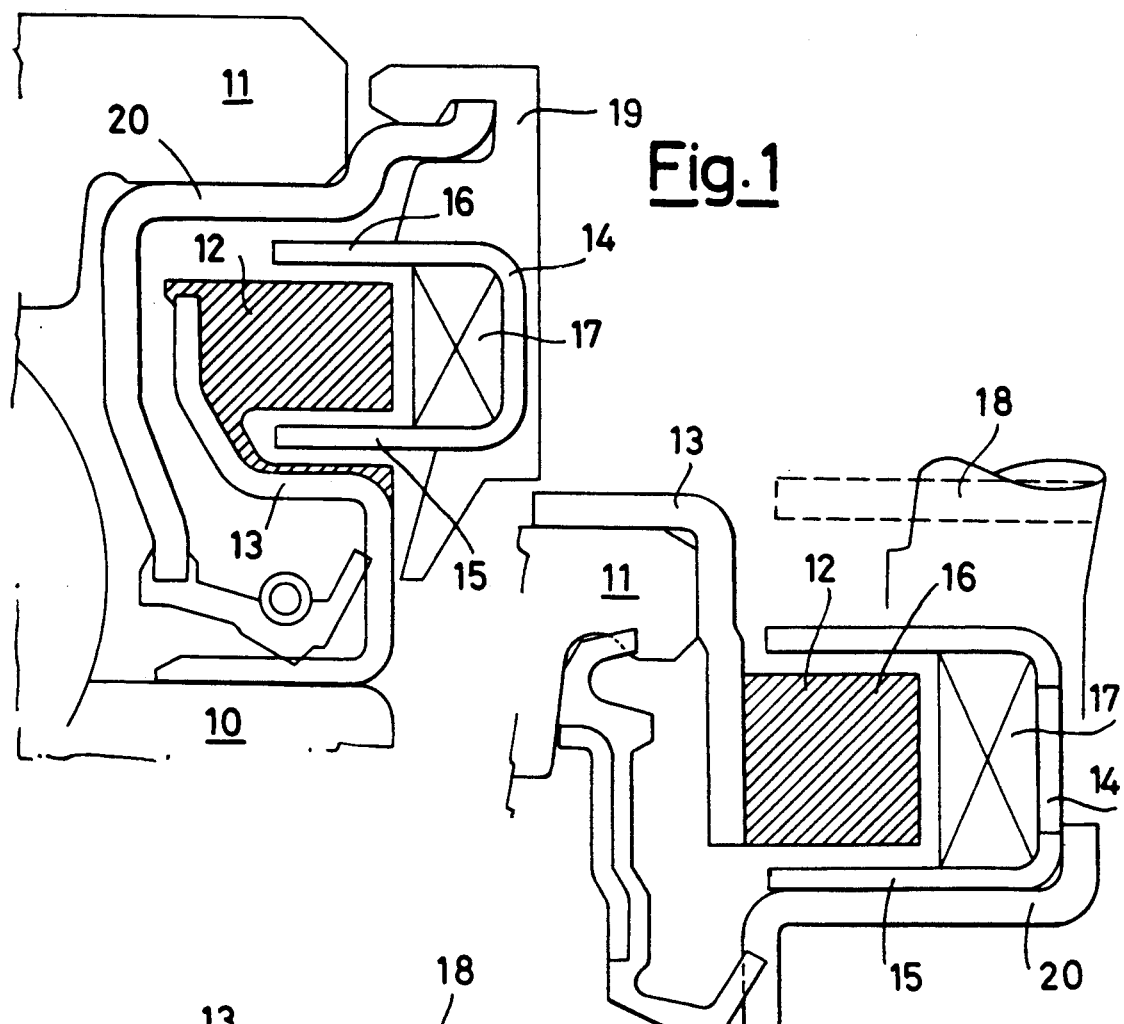
Fig.1
Fig.2
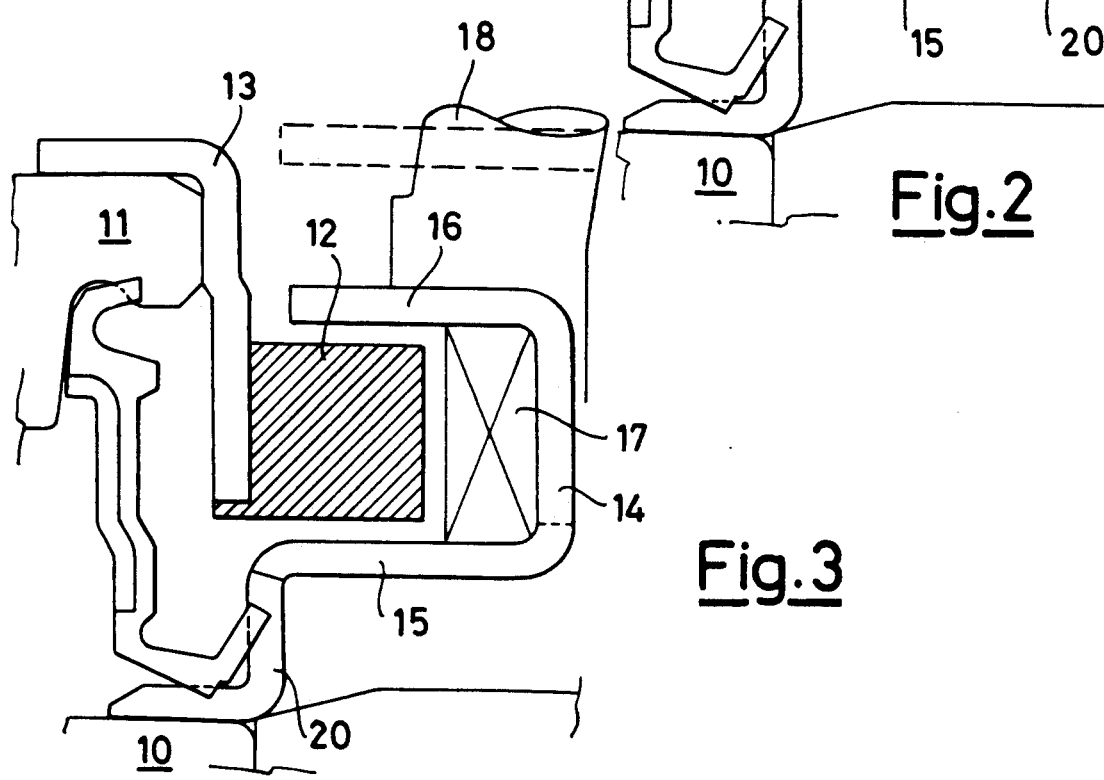
Fig.3

1

DEVICE ENABLING THE REVOLUTIONARY SPEED TO BE MEASURED BETWEEN TWO PARTS IN RELATIVE ROTATION SUCH AS THE SUPPORTS OF A VEHICLE WHEEL

BACKGROUND OF THE INVENTION

Subject of the invention is a device enabling the revolutionary speed between two rotating parts, such as the supports of a vehicle wheel, to be measured.

It is known that at present special control circuits known as ABS are installed on vehicles, the purpose of which is to prevent the wheels from blocking during the braking phase. The measurement systems presently being used are realized by means of common basic components such as: phonic ring, measurement sensor, an on-board computer and an oleodynamic gearcase.

Typically a phonic ring is a toothed ring mounted on the rotating part to keep under control while the sensor either passive or active, is installed on the stationary part of the frame at a certain distance from the opposite toothed area of the phonic ring.

The electric signals from the sensors are sent to the on-board computer of the ABS system measuring the speed difference between wheels.

Passive sensors, in use at present, are reluctance-change sensors and require no feed; however, these sensors must necessarily be mounted outside the bearing and are exposed to possible shocks, polluting agents and other possible dangers.

In particular this sensor can be damaged by metal particles (wear) from the brakes, which are close to the sensors and by high temperatures, developed by brake discs; they also need to be duly calibrated by the user during the assembly phase.

Active sensors presently in use are typically inductive consisting in a small coil fed by an oscillating circuit or by elements sensitive to magnetic field variations (Hall effect).

These sensors can be housed inside wheel bearings but they nevertheless need input from the outside.

SUMMARY OF THE INVENTION

The purpose of the invention is to propose a device enabling to overcome the inconveniences of the above described devices now being used.

More in particular, the purpose of the invention is to propose a device to measure the speed of rotation between two relatively rotating parts, such as vehicle wheel supports and particularly between the rings of a rolling bearing to support a vehicle wheel, characterized by the fact that a first shield integral with the rotating ring of the bearing carries a magnetized ring with pairs of alternate poles, operatively facing a passive sensor borne by a second shield integral with the stationary ring of the bearing; the sensor being inductive with n pole pieces in a number corresponding to the pairs of alternate poles of the magnetized ring; the configurations of shields and sensor being such that the elements measuring relative speed are integral with the shields and portected on the outside.

BRIEF DESCRIPTION OF THE DRAWINGS

The device according to the invention will now be described referring to the enclosed drawings, wherein:

FIGS. 1 to 5: these FIG. show sections of a bearing and relevant shield equipped with the device subject of the invention in various possible configurations both of bearing with shield and of the device;

BETAILED DESCRIPTION

Figure 4:
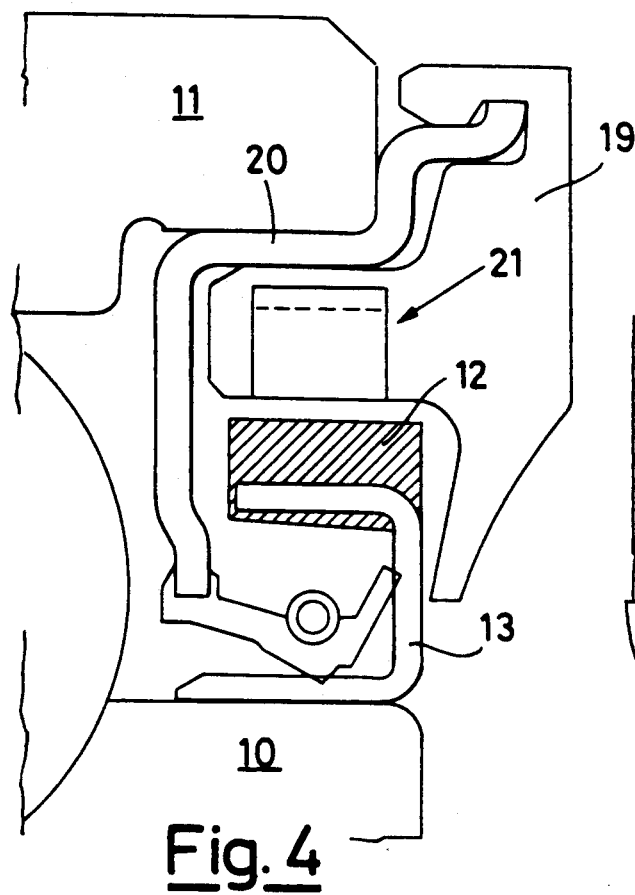
Figure 5:
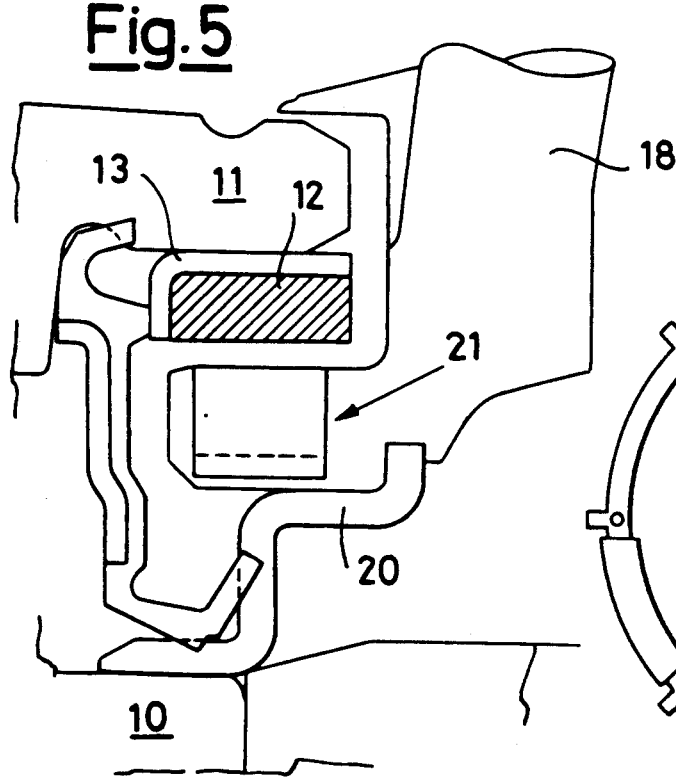
Figure 11:
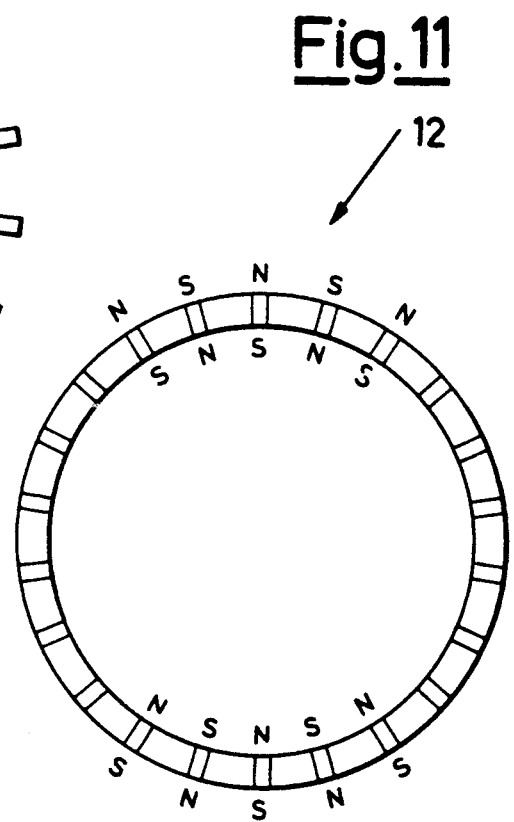
FIG. 11 is the front view of the magnetized phonic ring of FIGS. 1, 2, 3, 4 and 5.

FIGS. 1 to 5 show a detail of a bearing equipped with this device in a few different configurations of this invention. In FIGS. 2, 3, and 5 outer ring 11 of the bearing rotates, while inner ring 10 is stationary. Vice versa, in FIGS. 1 and 4 inner ring 10 rotates and outer ring 11 is stationary. In all of the above mentioned configurations phonic ring 12 is made of magnetized material according to the invention as schematically illustrated by FIG. 11, that is with pairs of magnetic poles of opposite polarity alternating in variable number according to ring diameter and maker's requirements.

Ring 12 is supported by a rigid profile 13, duly sized and fixed to the rotating ring of the bearing, which, as already described for the configurations of FIGS. 1 and 4, is inner ring 10, while for the configurations described by FIGS. 2, 3, and 5 it is outer ring 11.

Facing ring 12 is the sensor, various configurations of which are possible and some of which are shown by FIGS. 6, 7, 8, 9 and 10.

Figure 8:
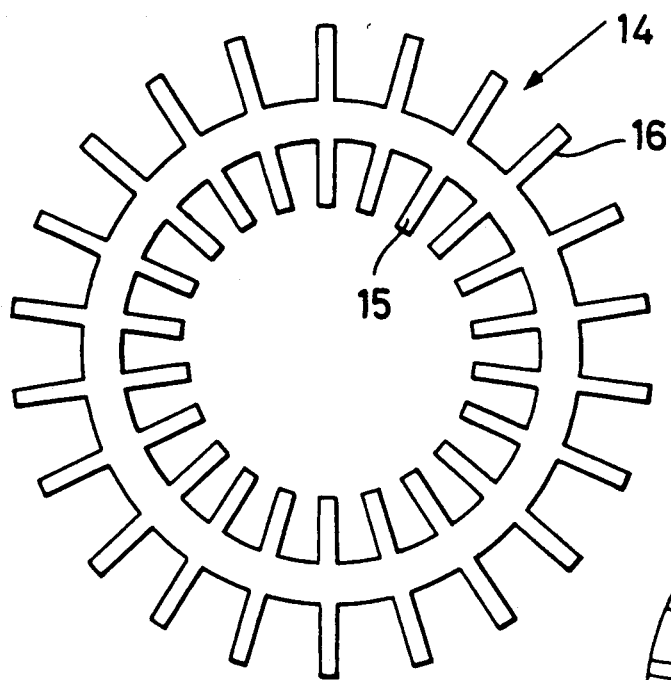
FIGS. 8, 9 and 10 are resp. the expanded, front and side views of a detail of the sensor of FIGS. 1, 2, and 3.
Figure 9:
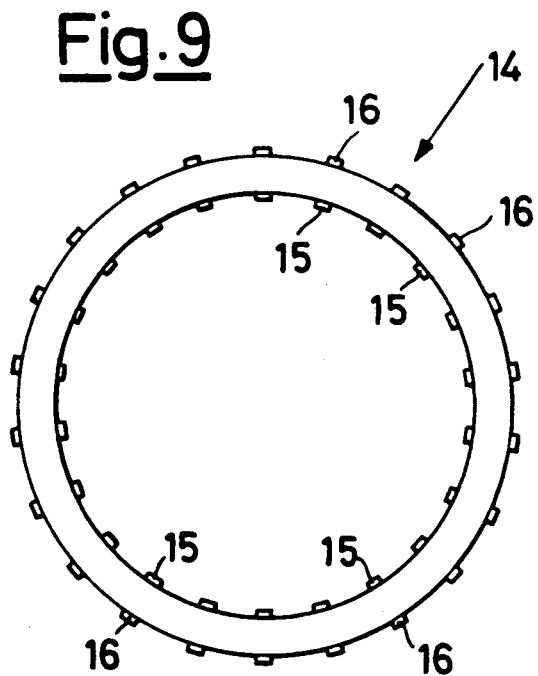
Figure 10:
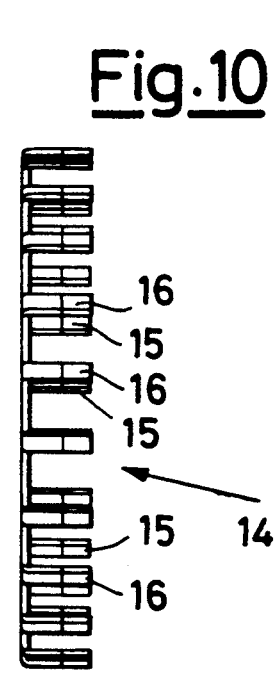

The first configuration is shown by FIGS. 8, 9 and 10 where the sensor has a ring 14, which, expanded, (FIG. 8) has inner radial appendices 15 and outer radial appendices 16 folded towards one side of the ring in the configuration shown by FIGS. 9 and 10.

Ring 14 in this configuration will have an inner detecting coil 17 (FIGS. 1 to 3) and will be connected with a deta-processing on-board gearcese by means of a cable or a connector 18.

For what ring 14 is still concerned, the tips of its outer appendices 16 and inner appendices 15 will permit to close an N number of sensor pole pieces, also variable, like the pairs of magnetic poles with opposite polarity of rotating ring 12.

Referring to FIG. 1 the ring is supported by a block 19 engaged on the projected end of shield 10 of the bearing or directly on the stationary ring of the bearing.

In the configuration of FIG. 2 the ring is fixed by its inner appendices 15 to shield 20. While in the configuration of FIG. 3 ring 14 is integral with or welded to shield 20. In all configurations, however, the sensor unit is inside the shield, intergral with it, therefore it does not feel any variation of the brake disc temperature, is not exposed to wear by metal particles from the brake disc, is protected against any outer polluting element and requires no previous calibration by the user. Even if the configuration of ring 14 shown in FIGS. 8, 9, and 19 seems to be the most advantageous and reliable configuration, the ring can have other configurations, too.

For instance, outer fins 16 or inner fins 15 can be missing, therefore the remaining fins 15 or 16 provide for closing the pole pieces of the the sensor.

Alternatively, again, outer fins 16 or inner fins 15 can be replaced by a fold obtained on the ring perpendicular to the ring face so that coil 17 is contained between two endless surfaces (the face of the ring and the surface perpendicular to it) and a row of fins 15 or 16.

The latter will close the pole pieces of the sensor, while the endless surfaces will contain both sensor and relevant magnetic flux.

Sould one of the rows 15 or 16 be replaced by an endless surface, this could advantageously be welded or be integral with shield 20 making the unit even simpler and more reliable.

Figure 6:
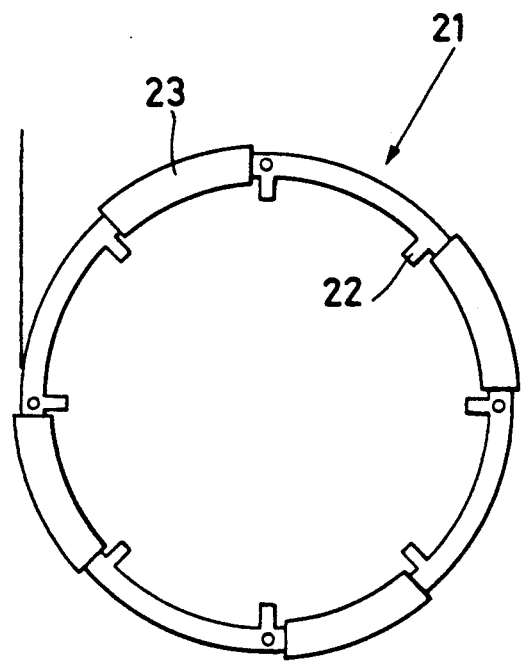
FIGS. 6 and 7: front views of the sensor adopted resp. by the solutions of FIGS. 4 and 5.
Figure 7:
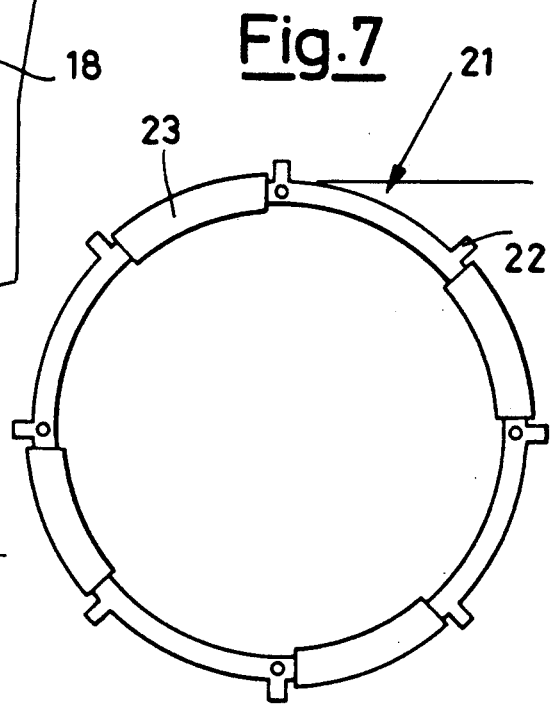

In the configuration shown by FIGS. 6 and 7 ring 21 of the sensor has radial appendices 22, either inner (FIG. 6) or outer (FIG. 7) equally spaced along the circumference and in relation to the number of polar pairs of opposite sign of the magnetized ring.

Moreover ring 21 bears windings 23 alternating between the adjacent appendices 22 as illustrated in the figures.

FIGS. 6 and 7 show four windings, but their number can vary 1 to n (wherein n is the numer of pole pairs divided by two).

These appendices 22, too are pole pieces of ring 21, which is mounted through a block 19 in the configurations shown in FIGS. 4 and 6, so as ring 14 of FIG. 1 was mounted; the ring of FIGS. 5 and 7 is mounted directly on the appendix of shield 20 of the bearing.

In this case, too the sensor is integral with the bearing shield with the same advantages of the configuration described above.

In the configurations of ring 21, FIGS. 6 and 7, the rotating ring 12 can be polarized radially through, like schematized by FIG. 11, but it can also be polarized on the outer side (when used in the configuration of FIGS. 4 and 6) or only on the inner side (when used in the configuration of FIGS. 5 and 7) in that it is enough for the polarized surface to be met at pole pieces 22 of ring 21.

Therefore, it appears that all configurations obtain a passive, inductive, flux-modulating sensor, with n pole pieces integral with the bearing shield.

Being passive it requires no input; being inductive, flux-modulating and with n pole pieces it permits to obtain a signal which is directly compatible with the present gearcases and highly reliable and precise.

We claim:

1. Device enabling the speed to be measured between two parts in relative rotation such as the supports of a vehicle wheel and in particular between rings of a rolling bearing for the support of a vehicle wheel, characterized by the fact that first shield integral with a rotating ring of the bearing carries a magnetized ring with pairs of alternate poles, which is placed in front of, in operation, a passive sensor borne by a second shield attached to the fixed ring of the bearing; the sensor being inductive with n pole pieces in a number proportional to the pairs of alternate poles of the magnetized ring; the configurations of shields and sensor being such that the elements measuring the relative speed are integral with the shields and protected outwards.

2. Device as per claim 1 characterized by the fact that the sensor consists of a ring having inner and/or outer appendices perpendicular to the surface of the ring, closing pole pieces as to such rotary magnetized ring with pairs of alternate poles and by a measurement coil wound inside the ring between the appendices.

3. Device as per claim 2 characterized by the fact that the sensor ring is supported by a block fixed to the ends of the shield of the stationary bearing ring or to the ring itself, from which a cable or a connector reaches the signal-processing appliance.

4. Device as per claim 2 characterized by the fact that the sensor ring is integral with the stationary ring of the bearing.

5. Device as per claim 1 characterized by the fact that the sensor consists of a ring having radial inner or outer appendices equally spaced, closing the pole pieces as to such rotating magnetized ring with pairs of alternate poles; between the alternate pairs of adjacent appendices being realized windings forming the measurement system.

6. Device as per claim 5 characterized by the fact that the sensor ring is supported by a block fixed to the ends of the shield of the stationary bearing ring or to the ring itself, from which a cable or a connector reaches the signal-processing appliance.

7. Device as per claim 5 characterized by the fact that the sensor ring is integral with the stationary ring of the bearing.

* * * * *

UNITED STATES PATENT AND TRADEMARK OFFICE
CERTIFICATE OF CORRECTION

PATENT NO. : 5,004,358

DATED : April 2, 1991

INVENTOR(S) : Angelo Varvello et al.

It is certified that error appears in the above-identified patent and that said Letters Patent is hereby corrected as shown below:

In column 1, line 62, change "portected" to read --protected--.

In column 2, line 10, change "BETAILED" to read --DETAILED--.

In column 2, line 38, change "deta-processing" to read --data-processing-- and change "gearcese" to read --gearcase--.

In column 2, line 52, change "intergral" to read --integral--.

In column 3, line 4, change "Sould" to read --Should--.

In column 4, claim 1, lines 2-4, delete "such as the supports of a vehicle wheel and in particular between rings of a rolling bearing for the support of a vehicle wheel".

In column 4, claim 1, line 5, after "fact that" insert --a--.

In column 4, claim 1, line 6, change "the" to read --a--.

In column 4, claim 1, line 9, delete "the" (first occurrence) and insert the word --a--.

UNITED STATES PATENT AND TRADEMARK OFFICE
CERTIFICATE OF CORRECTION

PATENT NO. : 5,004,358

DATED : April 2, 1991

INVENTOR(S) : Angelo Varvello et al

It is certified that error appears in the above-identified patent and that said Letters Patent is hereby corrected as shown below:

In column 4, claim 1, line 13, delete "the" (first occurrence).

Signed and Sealed this

Twenty-second Day of September, 1992

Attest:

DOUGLAS B. COMER

*Attesting Officer*      *Acting Commissioner of Patents and Trademarks*